United States Patent [19]
Williams et al.

[11] 3,978,482
[45] Aug. 31, 1976

[54] DYNAMICALLY FOCUSED THINNED ARRAY

[75] Inventors: Frederick C. Williams, Topanga; Elvin E. Herman, Pacific Palisades, both of Calif.

[73] Assignee: Hughes Aircraft Company, Culver City, Calif.

[22] Filed: Mar. 24, 1975

[21] Appl. No.: 561,523

[52] U.S. Cl. .............................. 343/11 R; 343/5 R; 343/100 SA; 343/112 D
[51] Int. Cl.² .......................................... G01S 9/06
[58] Field of Search ............... 343/5 R, 11 R, 13 R, 343/100 SA, 112 D

[56] References Cited
UNITED STATES PATENTS

| | | | |
|---|---|---|---|
| 3,268,895 | 8/1966 | Colchester | 343/112 D |
| 3,303,503 | 2/1967 | Stabilito | 343/112 D |
| 3,484,784 | 12/1969 | McLeod | 343/5 R |
| 3,568,198 | 3/1971 | Borowitz | 343/11 R X |

FOREIGN PATENTS OR APPLICATIONS

| 1,041,589 | 9/1966 | United Kingdom | 112 D/ |
|---|---|---|---|

*Primary Examiner*—T.H. Tubbesing
*Attorney, Agent, or Firm*—Walter J. Adam; W. H. MacAllister

[57] ABSTRACT

A thinned array real time radar system having an antenna array with receiving elements spaced more than one wavelength apart and having a dynamic means for programming the focus of the array so that it is time sequentially focused to accommodate radar echoes over a range interval from a near range out to infinity to provide an improvement in azimuth resolution, the improvement being substantially large for the near ranges. The system includes a separate mixer for every element of the array for receiving return energy therefrom and with each mixer having a separate local oscillator input. The local oscillator frequency varies as a prescribed first function during each period of processing over the selected range interval and the path length distribution of the feeds between the local oscillator and each individual mixer vaires as a prescribed second function. The first and second functions may be separable functions of an expression approximating the time-space variations of the spherical phase front received by the antenna array. The local oscillator feed is selected so that the distance from the local oscillator to each particular mixer varies as a function of the distance squared from the center of the array or processing point of the array.

15 Claims, 18 Drawing Figures

DYNAMICALLY FOCUSED THINNED ARRAY

BACKGROUND OF THE INVENTION

1. Field of the Invention

This invention relates to thinned array radar system, and particularly to a system to dynamically focus such an array so as to provide the best possible resolution at every range of data received in sequence during the time interval of a radar return.

2. Description of the Prior Art

Bistatic thinned array radar systems such as described in U.S. Pat. Nos. 3,825,928 and 3,842,417 provide a highly simplified receive antenna because the antenna radiating elements are separated by a spacing of one wavelength or greater so as to require a minimum of elements. The receive antenna thus has a resultant multilobe receive pattern with a selected lobe being illuminated by the single main lobe of a separate transmit antenna. Because of the small number of receiving elements, a separate radar receiving module including a mixer may be provided for each antenna receiving element at which point the received signals are heterodyned to IF by a phase shifted local oscillator signal. The IF outputs of all elements or each subarray of elements in the receive antenna are coherently summed and combined. The combined signal is post IF amplified and detected to form the total receiver output signal. By corporately combining the received energy at IF frequencies rather than at RF (Radio Frequencies) the system has minimum signal losses and can employ coaxial cable rather than waveguides between the antenna elements and the receiver. Coaxial cables have the advantage that they may be mounted where space is limited such as in the wing of an aircraft. A similar approach can be taken for large, two dimensional, thinned arrays if the need arises for such a device. For point targets at very long ranges, the incoming wave to the receive antenna is approximately a plane surface but at shorter ranges this surface becomes spherical with a radius equal to the range R. When a significant phase error ($\pi/2$) is introduced across an antenna that is focused on a plane wave by the curvature of this spherical surface, the antenna is said to be operating in its near field and must be focused at every range to maintain its theoretical resolution of $R\lambda/l$ where $\lambda$ is the wavelength and $l$ is the antenna length. In most thinned array configurations the near field range is quite large being equal to $l^2/2\lambda$ which for example is 12,500 feet for the 50 foot long X-band antenna. To provide dynamic focusing at these shorter ranges during the processing, any phase correction must operate with great speed. For example, the phase at the end of the array must change at about 360° per microsecond at a range of 1,000 feet for a 50 foot X-band antenna. Such rates of change are quite difficult to perform with phase shifters and unless done very quickly would tend to break up the radar imagery at the points of phase change. A simplified focusing system that does not require the complexity of high speed phase shifters and that would not distort the radar imagery would be a substantial advantage to the art.

SUMMARY OF THE INVENTION

Briefly the thinned array system of the invention dynamically programs the focus of the thinned array so that it is time sequentially focused to accommodate radar echoes over a region extending from a very short range out to infinity. The system employs variation of the local oscillator frequency together with differential path lengths in the local oscillator lines feeding the various mixer elements at each antenna element along the receiving array. The differential spacing between any adjacent pair of elements varies linearly so that the total path length distribution from the local oscillator to the mixers (assuming a similar distance between each of the mixers and its corresponding antenna element) varies nonlinearly over the entire array. The local oscillator signal is frequency modulated or ramped during the active range reception interval to vary from a high frequency to a lower frequency as a selected nonlinear function. In one arrangement in accordance with the invention, the spherical phase front or the unfocused received energy is approximated by a separable parabolic function with the local oscillator frequency varying as a function of one over time and the local oscillator feed total path length distribution varying quadratically as a function of the distance squared along the array from its center. As a result of the frequency variation and the delay pattern in the local oscillator channel feed lines, differential time-varying phase shifts are obtained at the outputs of these lines feeding the various mixers. Accurate and reliable focusing is thus performed at each range bin or resolution cell position over substantially the entire range processing interval. Because ramping of the local oscillator signal results in a corresponding spectrum ramping of the received echo energy in the various receiving channels, compensation is provided by utilizing a double conversion IF arrangement with counter-ramping at the second local oscillator. The system operates to provide reliable focusing with a corresponding improvement in azimuth resolution for either fixed pointing of the receive antenna or scanning around its central pointing direction. When a parabolic distribution is provided for the local oscillator feed lines, a convenient maximum differential spacing in accordance with the invention is the spacing of the two end receive antenna elements.

It is therefore an object of this invention to provide a dynamic focusing system operable with a real time radar processor.

It is another object of this invention to provide a radar system having a relatively high azimuth resolution at very short ranges.

It is still another object of this invention to provide a processing system for a thinned array receiving antenna that focuses the thinned array data, especially at ranges in the near field.

It is yet another object of this invention to provide a dynamic means of programing the focus of a thinned array so that it is time sequentially focused to accommodate radar echoes over a region lying from well within the near field out to the maximum range of the radar.

It is another object of this invention to provide a simple and reliable focusing system for a radar system having a plurality of individual mixers converting the energy from the various antenna receiving elements.

BRIEF DESCRIPTION OF THE DRAWINGS

These and other objects, features and advantages of the invention itself will become apparent to those skilled in the art in the light of the following detailed description, taken in consideration with the accompanying drawings wherein like reference numerals indicate like or corresponding parts throughout the several parts wherein.

DESCRIPTION OF THE PREFERRED EMBODIMENT

Figure 1:
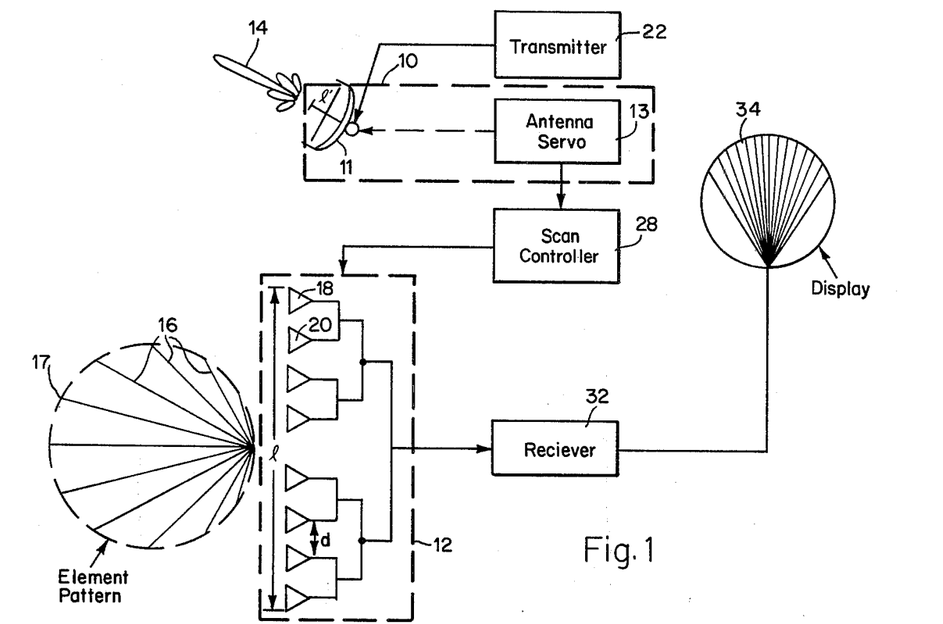
FIG. 1 is a schematic block diagram for generally explaining a bistatic radar system utilizing a thinned array in which the focusing system in accordance with the invention may be utilized.

Referring first to FIG. 1, the bistatic radar system that may be focused in accordance with the invention includes a transmit antenna 10 which may be mechanically scanned or electronically scanned and a receive antenna 12 which is a thinned antenna array that may be phase scanned. In other arrangements in which the principles of the invention may be utilized, both the transmit and receive antennas may be electronically scanned arrays properly synchronized in scan position. The transmit antenna 10 is illustrated as a mechanical antenna 11 having a parabolic shape and of diameter $l'$ and controlled by an antenna servo 13. The receive antenna 12 is illustrated as an electronically scanned array of length l that may be phase scanned. The transmit antenna 10 has a single main lobe pattern 14 and the thinned array receive antenna 12 has a multibeam pattern 16 within the element pattern 17 resulting from the wide spacing of the radar elements such as 18 and 20. A thinned array may be defined as an antenna array in which the spacing d between elements is equal to or greater than the wavelength of the RF signal. The superposition of the two patterns 14 and 16 in which only one lobe of the pattern 16 is enclosed by the lobe 14 provides a high azimuth resolution bistatic radar system. The transmitter 22 is coupled to the mechanically scanned antenna 10 which scans in azimuth under control of the antenna servo 13. A scan is defined as entire rotation of the antenna across a sector in space, for example. The antenna servo 13 also provides timing or master clock pulses to a scan controller 28 that applies control signals to the receive antenna to point a main lobe of the multi-lobe pattern of the receive array in the same direction as the transmit antenna. The output of the receive array is applied to a receiver 32 that provides amplification and processing of the signal which is then applied to a display 34 which for example may be a sector PPI type display. The scan controller 28 may be a read-only digital or analog memory providing phase control signals to to the antenna 12 in response to a master clock or positional pulse applied thereto from the antenna servo 13 to maintain synchronization of the pointing direction of the two antennas. Although the principles of the invention are illustrated with a thinned receive array and a single main lobe array for transmission it is to be understood that the scope of the invention includes use of a thinned array for transmission and a properly positioned convention or single main lobe array for reception.

Figure 2:
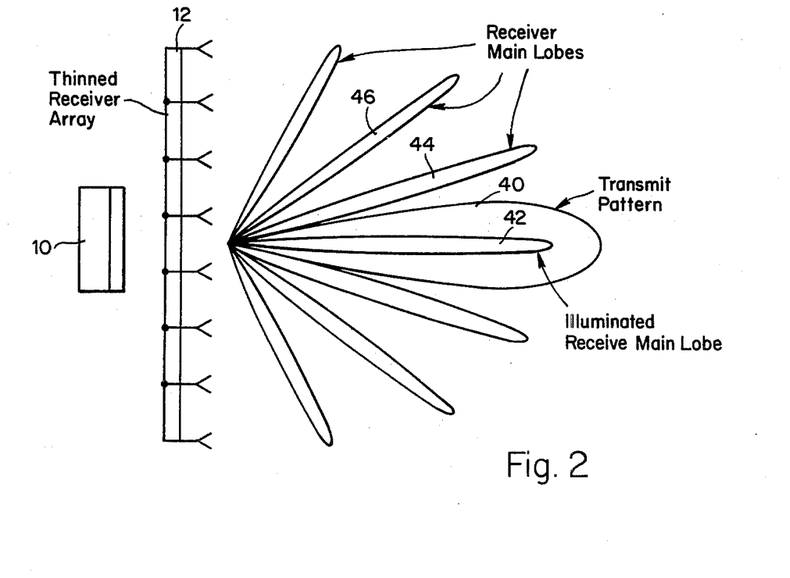
FIG. 2 is a schematic plain view showing the transmit and receive antenna for a thinned array real time radar system and their patterns for further explaining the operation of the thinned array system in which the focusing system in accordance with the invention may be utilized.

Referring now to FIG. 2 which shows a transmit antenna 10 which may be either a mechanically scanned antenna or an electronically scanned antenna and the receive antenna 12 centered on the antenna 10 representative of a thinned phase scanned receive array. Also within the scope of the invention the receive antenna 12 may be an array of elements mechanically scanned or scanned with a combination of mechanical movement and phase shift. The transmit pattern is shown by a lobe 40 pointing in a forward direction. The receive pattern is shown by lobes 42, 44 and 46 with the lobe 42 being centered on the transmit lobe 40. The wide spacing of the thinned array receiving elements (at least equal to or greater than the wavelength of the RF radar signal) generates the multi-lobe receiving pattern which would result in ambiguity or diversity of the various returns except for the transmit lobe pattern 40 being positioned and maintained coincident with the single lobe 42. Thus the transmit antenna will generate a well known broad beam continuous pattern of the lobe 40 and the relatively long thinned array will generate the multi-lobe receiving pattern with each lobe having substantially high azimuth resolution. The resulting radar pattern will be the product of two substantially different antenna patterns rather than the product of one antenna pattern as occurs in a mono-static or single antenna radar system. The general operation of the thinned array will not be explained in further detail as it is described in the above referenced patents.

Figure 3A:
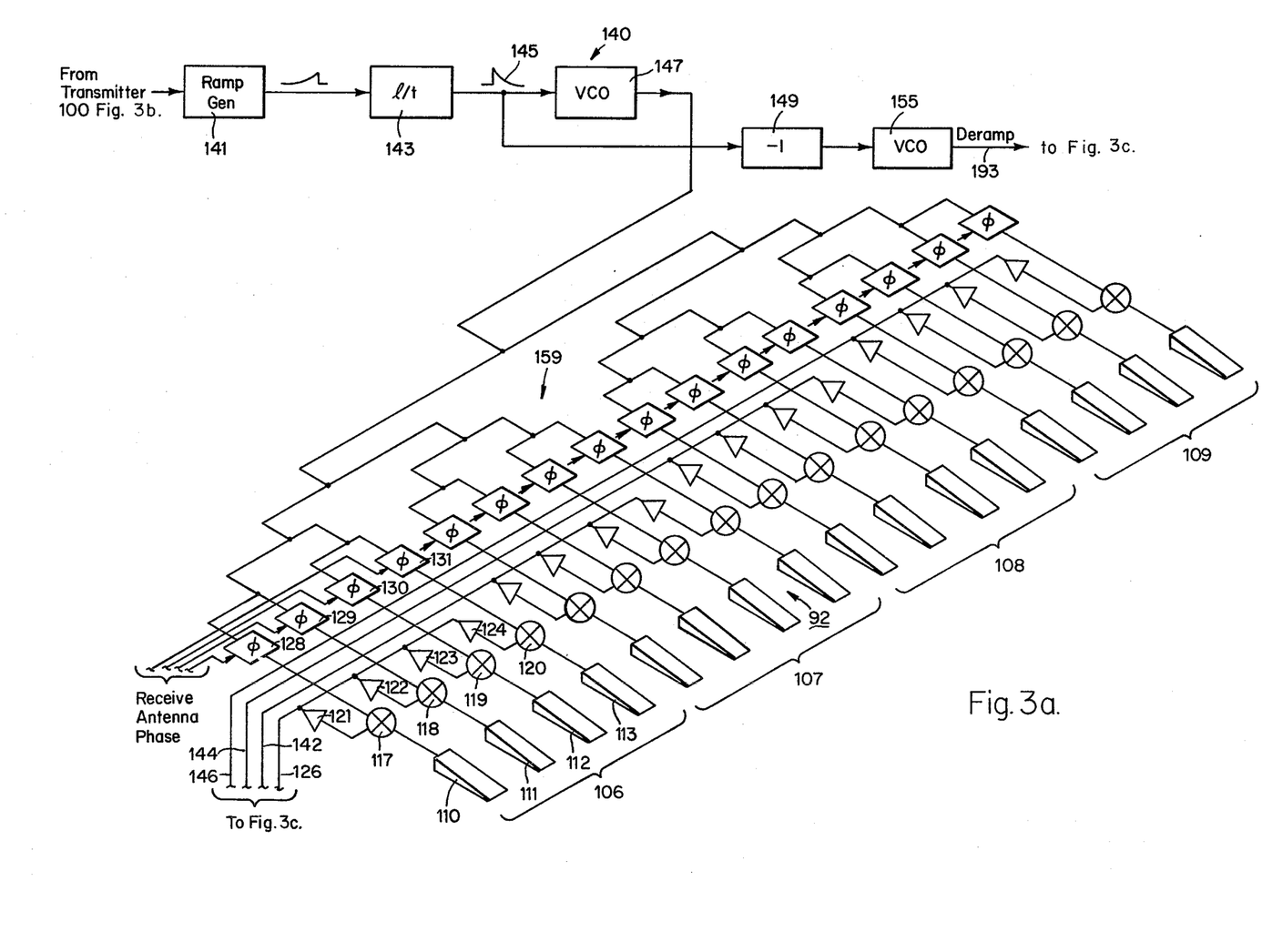
FIGS. 3a, 3b, and 3c are schematic block and perspective drawings of a thinned array radar system utilizing a wing mounted phased scanned array and with dynamic focusing in accordance with the principles of the invention.
Figure 3B:
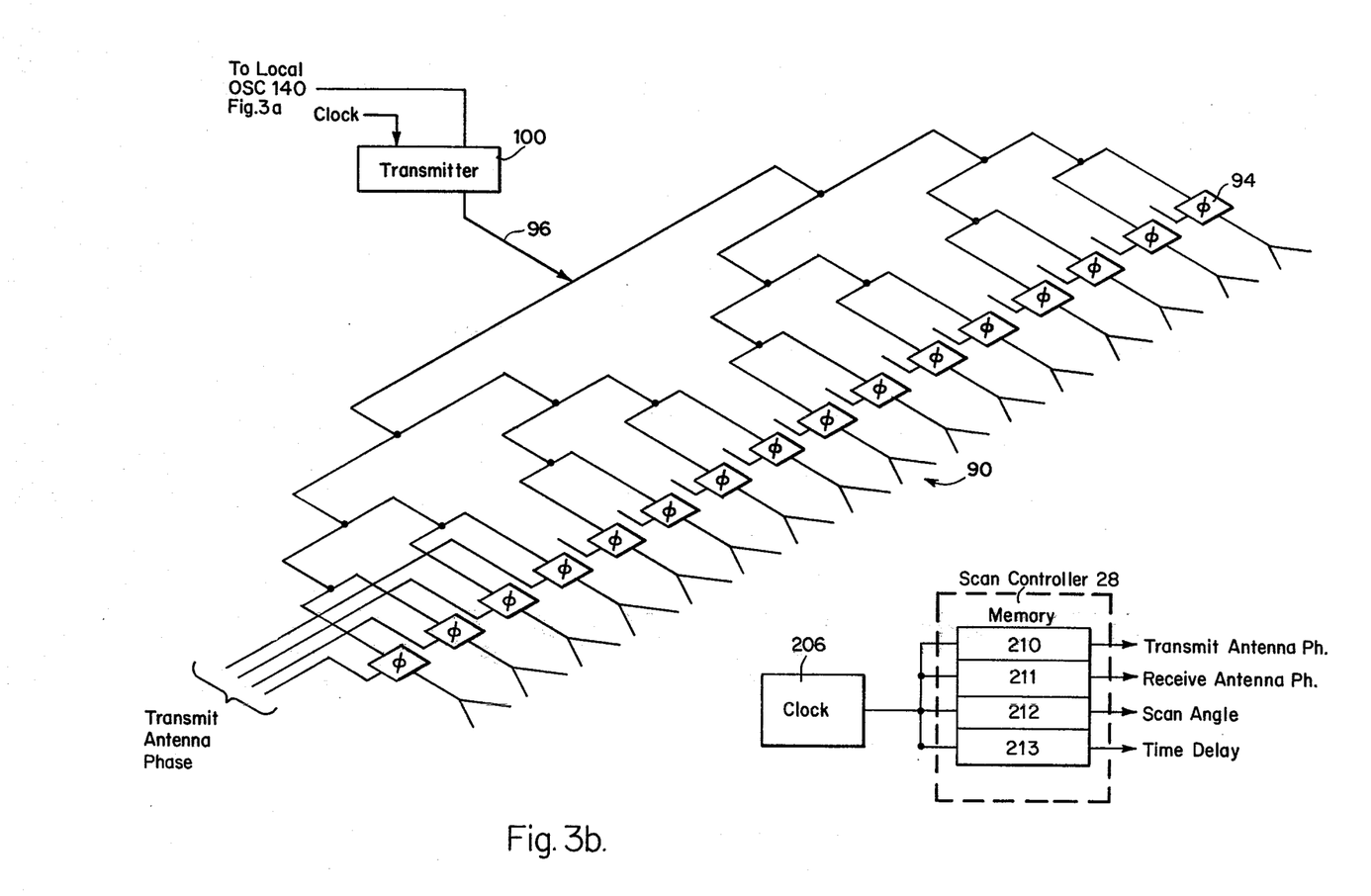
Figure 3C:
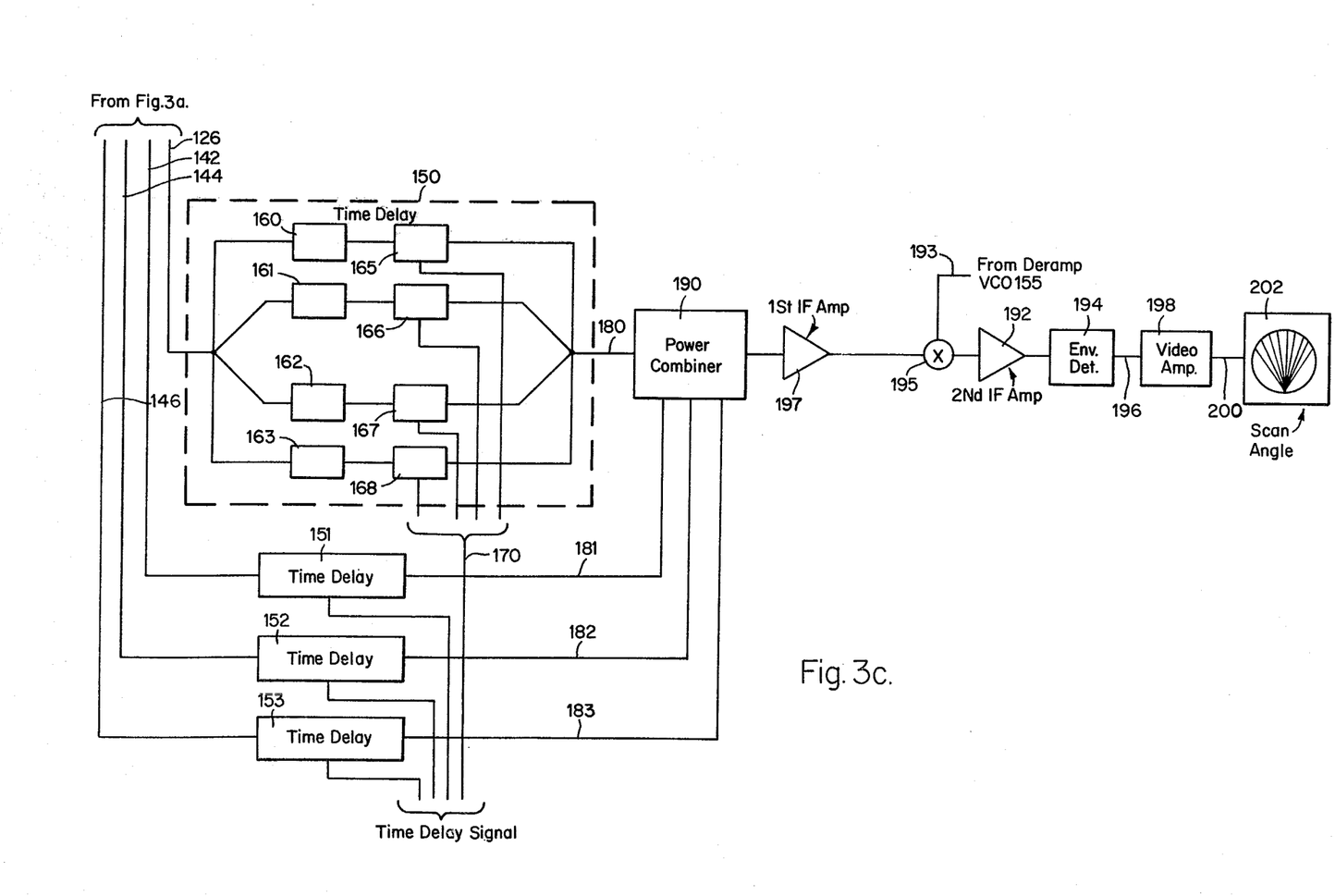

Referring now to FIGS. 3a, 3b and 3c the improved focused radar system in accordance with the invention will be further explained utilizing a phase scanned thinned array receiving antenna. The system includes a transmit antenna 90 which in the illustrated arrangement is a phase shift array having 16 elements with conventionally spaced elements i.e., in the order of ½ wavelength, and includes a receive antenna 92 which is a phase shift array having 16 elements where these elements are spaced by one wavelength or more. The transmit antenna 90 includes a plurality of phase shifters 94 coupled to a corporate feed 96 carrying the transmitted pulses from a transmitter 100. The transmit antenna phase control signals are provided by the scan controller 28 which applies proper phase commands to each of the phase shifters 94. The thinned array receive antenna 92 includes a plurality of subgroups 106 to 109 of antenna elements such as 110, 111, 112 and 113 of subgroup 106 which may be apertures, horns or wedge radiators as illustrated, or any other suitable antenna element. Antenna elements such as 110 and 111 have a spacing such that a minimum number of elements are required and with a resulting plurality of receive lobes. It is to be noted that in some systems the receive lobes may be selected to appear at the side lobe nulls of the transmitter antenna pattern. Coupled to each of the antenna elements such as 110 to 113 is a mixer such as respective mixers 117 to 120 which are in turn coupled to IF preamplifiers such as 121 to 124 which in turn are coupled to a common line 126. Thus, signals received in each of the subgroups of antenna elements such as 106 to 109 after passing through appropriate mixers are summed at IF in a common line such as 126. In order to provide phase shifting for steering the beam, each of the mixers such as 117 to 120 receives phase shifted local oscillator signals from respective phase shifters 128 to 131. An unequal-length corporate feed 159 is coupled to each of the phase shifters from a local oscillator 140 which may include a ramp generator 141 receiving AFC (Automatic Frequency Control) signals from the transmitter 100. A signal from the ramp generator is then applied to a function generator 143 which generates a function $l/t$ illustrated by a waveform 145. The signal generated by the generator 143 is then applied to a suitable VCO (Voltage Control Oscillator) 147 as a control voltage so that the VCO generates local oscillator signals at a decreasing frequency during each array processing interval. Also the output of the function generator 143 is applied through a inverter 149 and in turn to a VCO 151 that generates a deramp signal on a lead 193. The total path lengths from the VCO 147 to the mixers such as 117 to 120 is selected by the unequal length corporate feed 159 in the illustrated arrangement to provide a quadratic distribution. Although the path lengths are determined from the local oscillator to the mixers in the illustrated system in which the distances between each of the elements such as 110 and the corresponding mixers such as 117 is the same, if the distance between the antenna elements and the mixers varies across the array, this distance between each mixer and antenna element, proportioned as a function of the RF frequency, must be summed with the distances between the local oscillator and the mixers when selecting total path length distribution. The local oscillator corporate feed 159 may be constructed of any suitable conductor such as coaxial cable the latter is more desirable than waveguide for applications such as in the wing of an aircraft. Further it is to be noted that the signals of a subarray such as formed by elements 110 to 113, are combined at IF rather than at RF frequency.

Each of the other groups of sub-arrays 107, 108 and 109 are coupled to a different lead 142, 144 and 146. The signals in the leads 126, 142, 144 and 146 are then processed to overcome the time delay effects of off-broadside scan angles of the antenna.

Although the phase shift antenna may be phase corrected to guarantee coherent addition of the wavetrain, antenna scaning causes the return echoes to not simultaneously illuminate all elements of the antenna. This problem is overcome by providing a combination of time delay and phase delay in which each element of the antenna is phase shifted and the output signals of the elements of each sub-array are combined to generate one output signal such as on leads 126, 142, 144 and 146. The output signals from each different sub-array goes through a different switchable time delay 150 to 153 respectively receiving the signals on leads 126, 142, 144 and 146. Each time delay circuit such as 150 includes a delay element such as provided by lengths of coaxial cable 160, 161, 162 and 163 respectively coupled to switches such as 165 to 168. A time delay signal from the scan controller 28 is applied on a composite lead such as 170 to switches 165 to 168 so that as a function of the scan angle of the antenna, a selected one is energized. This operation at off-broadside angles is further explained in U.S. Pat. Nos. 3,825,928 and 3,842,417. After this time delay, the signals are applied through leads 180, 181, 182 and 183 to a suitable power combiner 190 which applies a combined signal through a suitable first IF amplifier 192 to a mixer 195 receiving a deramp signal on the lead 193 from the VCO 155. The signal from the mixer 195 at a constant second IF frequency is applied through a second IF amplifier 192 to an envelope detector 194. The envelope detector or video signal is then applied from the envelope detector 194 through a lead 196 to a video amplifier 198. The signal is then applied through a lead 200 to a suitable utilization unit such as a display 202 which for illustrative purposes is shown as a sector scan PPI which may receive a digital scan signal from the scan controller 28.

The scan controller 28 may for example include a suitable memory such as a read only memory response to a clock 206 and for example including memory sections 210, 211, 212 and 213 in which is stored the data for synchronizing the entire system. The transmit antenna phase may come from the memory section 210, the receive antenna phase from the section 211, the scan angle signal from the memory section 212 for controlling the azimuth angle of the display 202 and the time delay control signal from the memory section 213 for controlling the time delay circuits 150 to 153. The scan controller 28 provides system control by sequentially deriving coded words in response to a clock 206 and having an operation synchronized with the transmitter 100. It is to be noted that other control arrangements, as are well known in the art, may be utilized.

Figures 4A, 4B, 4C, 9, 12:
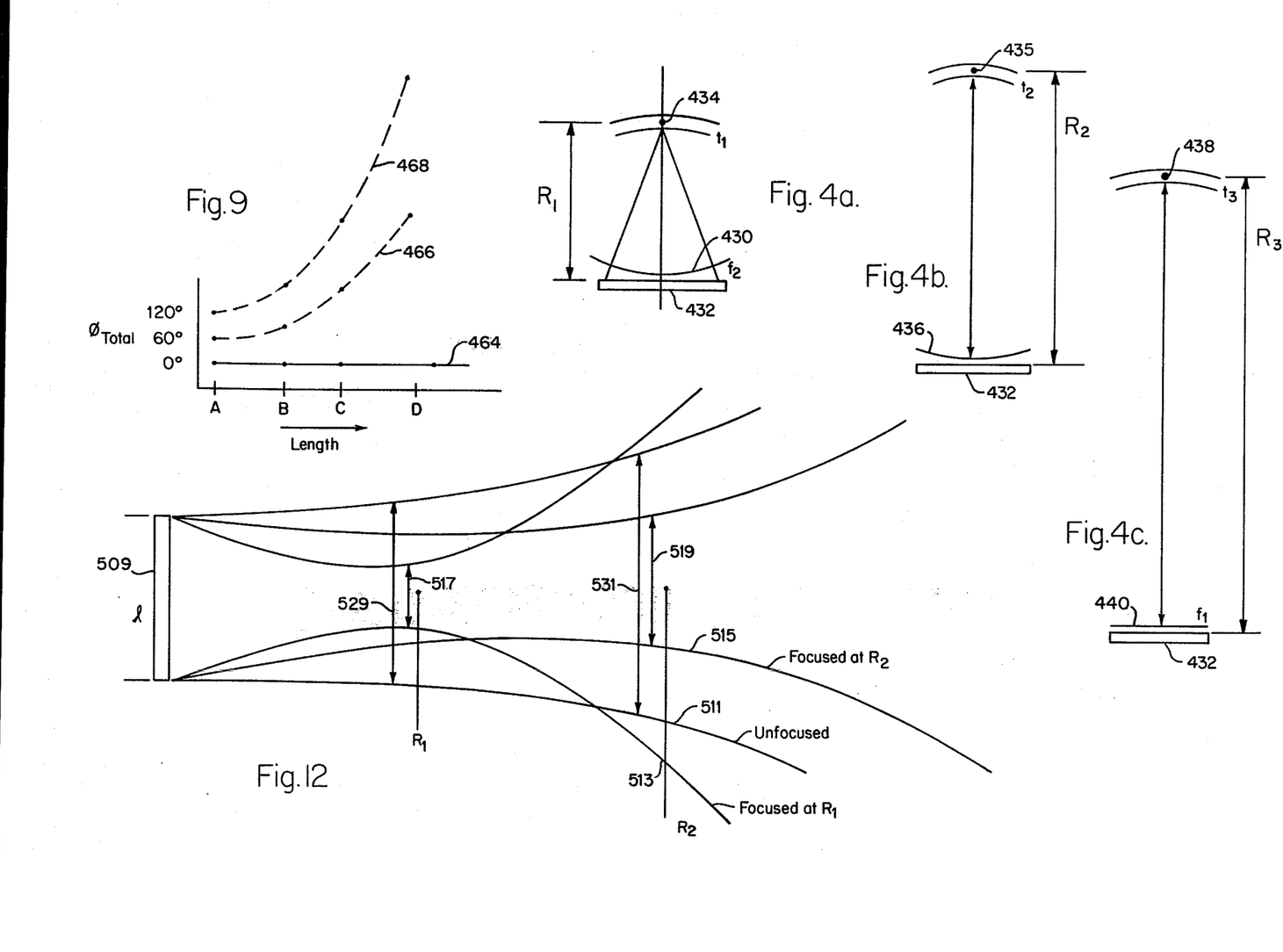
FIGS. 4a, 4b and 4c are schematic diagrams illustrating the incoming wavefronts for 3 point targets received from different range intervals and at different times.
FIG. 9 is a graph of total phase shift versus position along the array of FIG. 7.
FIG. 12 is a graph of the unfocused and focused antenna receive lobe pattern for further explaining the increase in resolution provided by the system of the invention.

Referring now to FIGS. 4a, 4b and 4c, a phase front 430 received by an antenna array 432 from a point scatterer or resolution cell 434 at time $t_1$ and at range $R_1 = c/2t_1$, (where $c$ is the speed of light) is spherical (or circular if the antenna elements are in one plane) for the near field operation. At a longer range $R_2$ indicated at a time $t_2$, a phase front 436 received by the antenna 432 from a point scatterer or resolution cell 435 is still circular (or spherical) but is flattened by the increased range. At a very long range $R_3$ which is at a time $t_3$, energy from point scatterers such as 438 is received with a phase front 440 at the antenna 432 that is approximately a plane surface. At very long ranges approaching infinity the phase front 440 is flattened to substantially a plane surface at the antenna 432. When a significant phase error $\pi/2$ or greater is introduced across an antenna that is focused on a plane wave, by the curvature of this spherical surface, the antenna is said to be operating in its near field and for good imagery must be refocused at every range to maintain its theoretical resolution of $R\lambda/l$ where $\lambda$ is the wavelength and $l$ is the antenna length. The system of the invention operates by focusing at the near range as well as at the longer ranges short of infinity such as at time $t_3$. It is to be noted that the illustrated system in accordance with the invention approximates the circular curvature of the phase fronts 430 and 436 with a parabola for simplicity of description but that the correction may be provided in accordance with the invention using other nonlinear variations such as a circle or other suitable expression. The correct curve for the circular wavefront is $kt[1 -\cos(x/kt)]$ where $x$ is the distance from the antenna array center and $k$ is a constant. The illustrated system utilizes the nearest separable function, i.e., $f(t)g(x)$ approximating expression, which is the first term in the Taylor series expansion of the expression or is $x^2/2kt$. The illustrated phase front correction is mechanized within the principles of the invention by controlling the local oscillator frequency variation as the separable function $1/t$ and by providing a local oscillator total path length distribution in accordance with the separable function $x^2$.

Figure 5:
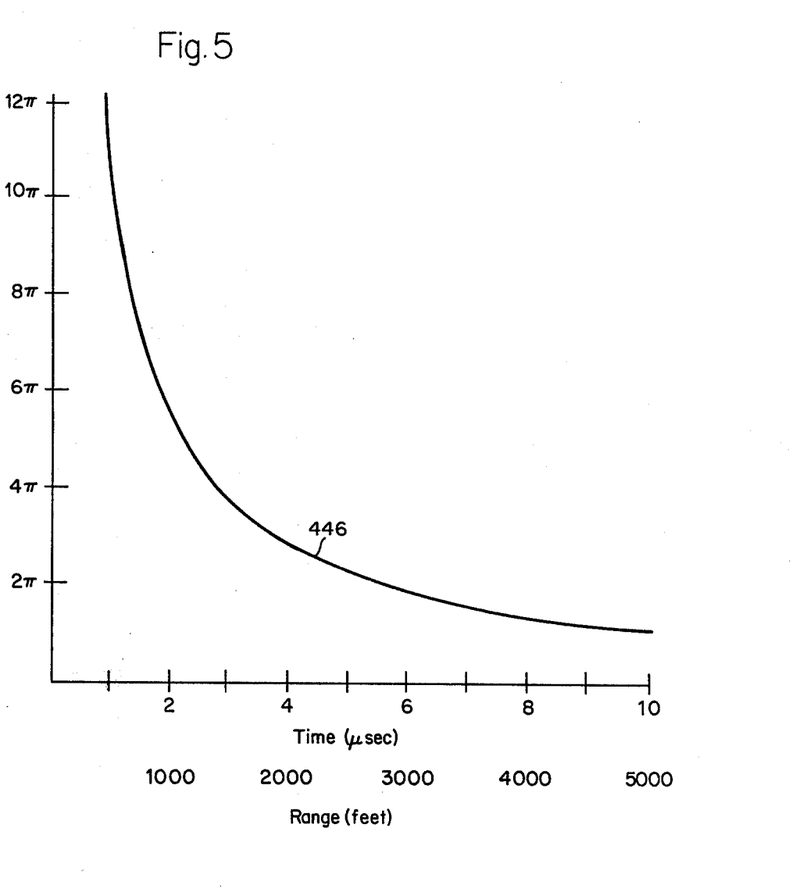
FIG. 5 is a graph showing as a function of range, the total phase corrections required at the ends of a 50 foot X-band antenna.

Referring now to FIG. 5, the required phase change at the ends as a function of time and range is illustrated for an example 50 foot x-band antenna by a curve 446 requiring a relatively small and slowly changing phase change at long ranges and a relatively large and rapidly varying phase change at shorter ranges. The phase change illustrated by the curve 446 is the correction that must be provided at each range cell or bin to develop a focused array and is related to the spherical or circular curvature of the phase front received at the antenna.

Figures 6, 7, 8, 11:
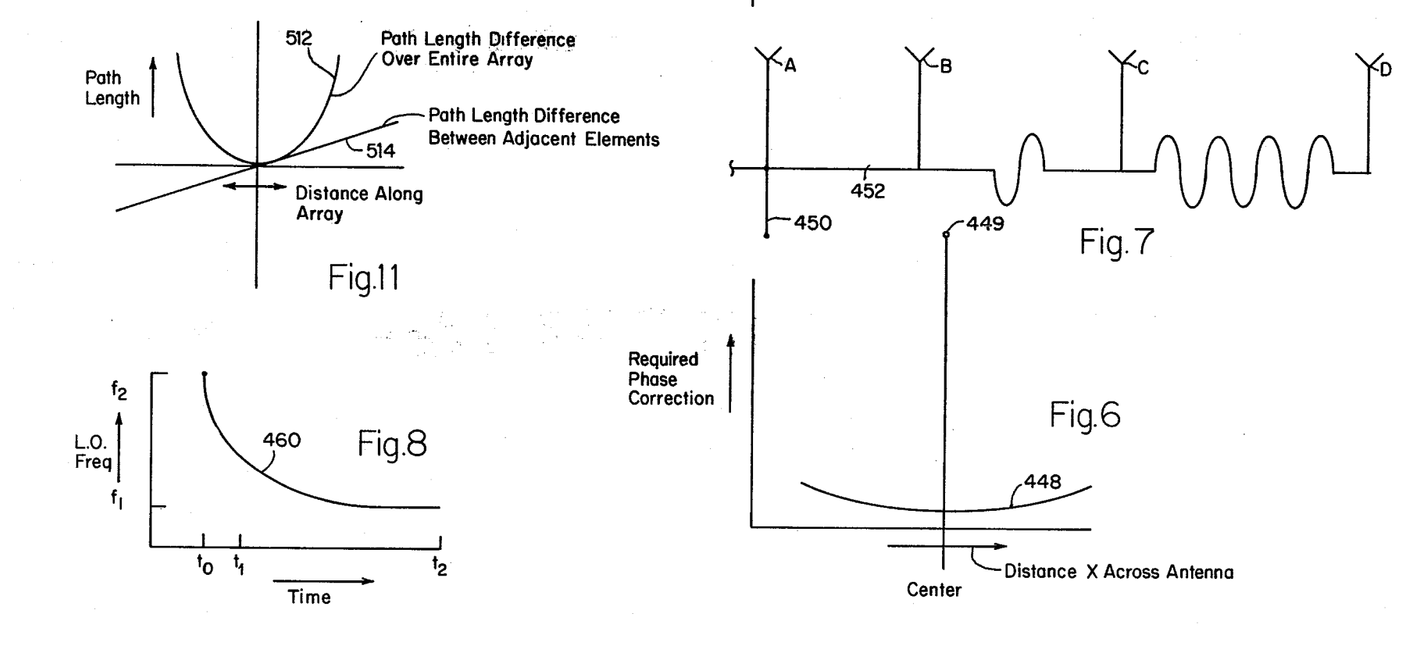
FIG. 6 is a schematic diagram showing the phase corrections required across the antenna for targets at a particular range as a function of the distance $x$ from the antenna center.
FIG. 7 is a schematic diagram illustrating 4 antenna elements of one half of an antenna for further explaining the required total and differential path length variation of the local oscillator feed lines.
FIG. 8 is a graph of required local oscillator frequency as a function of time for further explaining the focusing operation.
FIG. 11 is a graph of pathlength versus distance across the array for further explaining the local oscillator feed pathlength difference over the entire array.

Referring now to FIG. 6 a curve 448 illustrates the phase correction that is required across the antenna with the energy received from a point target 449 for one range versus the distance across the antenna array. At each antenna element for a single point target or resolution cell, a different phase correction is required to provide suitably focused and high resolution data.

Referring now to FIG. 7, the variation of the total path lengths of the local oscillator feed lines will be explained in further detail. It is to be noted that the path lengths from the local oscillator may be determined to the phase shifters when the distances from each antenna element to its corresponding phase shifter are the same. In the illustrated arrangement the distance from the local oscillator to each particular antenna element varies parabolically to approximate a circle. Also at a local oscillator frequency $f_2$ at the end of the frequency excursion, the phase shifters in the thinned array have been set so as to focus on a plane wave. Thus, as the local oscillator frequency is decreased as a function of $1/t$ during each array processing period the antenna will focus on a parabola of increasing radius or range. As an illustrative example, the local oscillator feed line 450 receiving a signal $\cos(\omega t)$ is 1 foot in length and, the fixed distance between the main feed line 452 and each antenna element A, B, C and D is 10 in., the spacing between A and B is 10 in., between B and C is 30 in., and between C and D is 50 in. If the total path length distance from the junction of lines 450 and 452 varies as 0, 1, 4 and 9 which is quadratic then the path length differential varies as 1, 3 and 5 which is linear. An expression for the total phase shift $\phi_T$ required for focusing is $\phi_T = \cos[\omega t + \phi + 2\pi(s/\lambda)]$ where S, is the local oscillator feed line path length along the feedline 452, $\lambda$ is the wavelength of the local oscillator at any particular frequency in time, $\omega$ is the radian frequency of the local oscillator in time and $\phi$ is a common phase shift term for each element or the length of line 450 and the distance from line 452 to the antenna element that varies with $\omega$. For an example of 10 GHz which may be the start of the L.O. frequency ramp at time $t_o$, $\lambda_o$ would equal about 1.2 in. $\omega_o$ equals $2\pi \times 10^{10}$ Hz and for element A $\phi_0 = 20$ in./1.2 in. = 16.67 cycles which is the common phase shift term for all elements and is equal to $= 33.33\pi$ or $120°$. At a later instant of time $t_1$, for element A, $\lambda_1 = 1.1$ in. $\phi_1 = 60°$ and $\omega_1 = 0.91 \times 2\pi = 10^{10}$ Hertz. At the end of the L.O. sweep at time $t_2$ for element A, $\lambda_2 = 0.12$ in., $\phi_2 = 0°$ and $\omega_2 = .83 = 2\pi \times 10^{10}$. As may be seen by a curve 460 of FIG. 8 the local oscillator frequency varies over time or range as a function of one over time as provided by the local oscillator control, the times $t_0$, $t_1$ and $t_2$ are shown.

Referring now to FIG. 9, $\phi_T$ or total phase change with the 4 antenna elements A, B, C, and D of one half of a symmetrical array is plotted with a curve 464 being at time $t_2$ at the final L.O. frequency of 10 GHz which may be the end frequency of the toal oscillator sweep so that no phase correction is required at elements A, B, C and D this being a condition when the point target is substantially at infinity or at a very long range. A curve 466 which represents the condition at time $t_1$ when the $\lambda_1$ of the local oscillator signal equals 0.11 feet shows that the phase change $\phi_T$ large increases parabolically for the sequential antenna elements A, B, C and D. A fixed phase change of $60°$ is also introduced that has no effect on system operation. As shown by a curve 468 which is for the condition where $\lambda_2 = 0.12$ in., the phase correction increases parabolically and move rapidly for each of the elements A, B, C and D. A fixed phase change of $120°$ is also introduced. Thus, the total phase shift provided by the local oscillator signal and the parabolic configuration of the total coaxial line paths provides focusing of energy received at all elements of the array as the signals are processed range cell by range cell.

For the illustrated arrangement whereby a parabolic approximation is utilized, the local oscillator frequency $\delta f = f_0 + L^2/4Mct$ where $L$ is the length of the array, $M$ is the total path length difference from center to end of the array, $c$ is the speed of light, $t$ is the time of reception increasing at greater and greater ranges and $f_o$ is the local oscillator frequency at near infinite ranges. Thus it can be seen that the local oscillator frequency varies as $1/t$ plus a constant.

Figure 10:
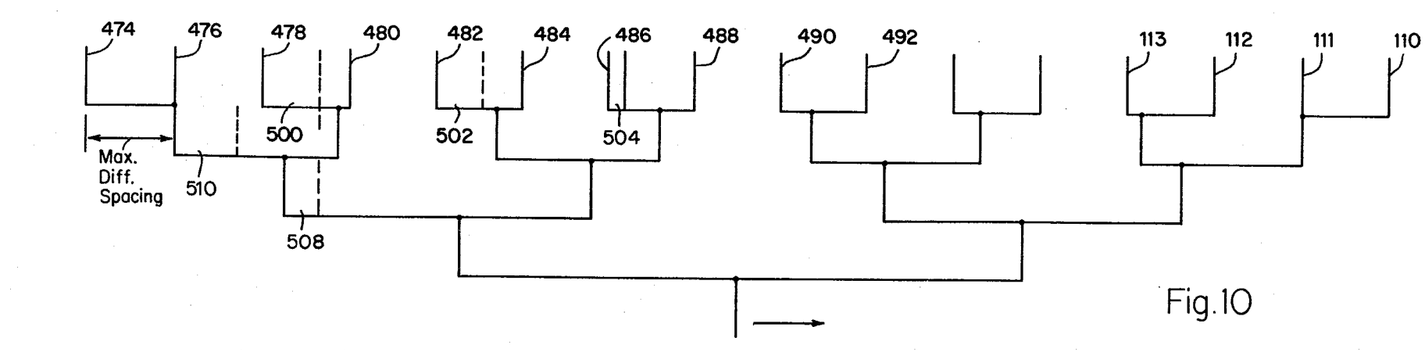
FIG. 10 is a schematic diagram of a local oscillator feedline distribution to further illustrate the differential spacing of the distribution system.

Referring now to FIGS. 10 and 11, the inter element spacing will be further explained. The compensation provided in the illustrated system over an array at ranges lying well within the near field from the array center out each end varies in a parabolic fashion. The path length from a point lying along the broadside center line of the array to various points along an array varies as $x^2/2R$ where X is the distance out in either direction from the array center and R is the distance from the scatterer to the array center. The required phase compensation at each point along the array outward from its center is $\phi_T = 2\pi X^2/2R$ radians. The required incremental phase compensation between successive elements outward from the center is $(d\phi/dx)\delta x = 2\pi X \delta x/R\lambda$ where $\delta X$ is the inter element spacing. The required incremental phase change between successive elements outward from the array center for a given range is linearly proportional to the distance outward. Thus, in some arrangements in accordance with this invention, a convenient configuration may be utilized as shown in FIG. 10 as well as in FIG. 3a. A corporate feed is illustrated with the branch points nonsymmetrically placed to provide the parabolic path length variation. Since the receiving elements are 1 or more wavelengths apart a convenient maximum differential spacing would be the inter element spacing $\delta X$ which is the spacing between the elements such as 474 and 476 and the elements 110 and 111. It is to be noted that if more differential spacing is required, the inter element length can be made greater than the space between the end elements within the principles of this invention. For feeding the elements 478 and 480 the corporate feed is connected so that a difference 500 is provided, for the elements 482 and 484 the coaxial local oscillator corporate feed is connected so that a difference 502 is provided and for the elements 486 and 488 the corporate feed is connected so that a difference 504 is provided. A similar difference is provided in the other half of the array in the local oscillator feed configuration which is arranged in a symmetrical fashion. For example, the difference spacing between elements 490 and 492 is similar to the difference spacing between the elements 486 and 488. Additional path length differences are introduced into the higher order branches of the corporate feed as shown by 510 in the secondary order branch and by 508 in the third order branch. The parabolic path length difference over the entire array is shown by a curve 512 of FIG. 11 and the path length difference variation between adjacent elements is shown by a curve 514, the FIGURE being plotted with feed path length as a function of distance along the antenna array.

There is a fundamental limitation to the minimum range at which the described system operates properly. This limit occurs because a required local oscillator frequency is proportional to $1/R$ and hence the rate of change of frequency is proportional to $1/R^2$. At very short ranges the outer phase shifters will see a different local oscillator frequency than the inner phase shifters due to the differential path lengths. This effect is aggravated at short range due to the increasing by rapid rate of change of frequency. Thus at very short ranges their are two types of errors; the local oscillator frequency spread across the antenna will spread the received spectrum and the wrong frequency at the ends of the array incurred by the finite feed line time delay will introduce phase errors. For an example of a 50 foot X-band antenna with a parabolic corporate feed as described, the frequency errors and the phase errors respectively provide a limiting range of 750 and 270 feet. Thus in this illustrated example the frequency spread provides a limiting minimum range of about 750 feet.

Referring now to FIG. 12, there is a showing of the operation of the focusing to improve the resolution of point targets, that is the ability to distinguish between two close together point targets without their merging into a single point target. The beam shape versus range 511 of the unfocused receive beam of an antenna 509 does not provide a resolution better than the antenna length $l$. For a target at range $R_1$ with the focusing operation of the invention, a beam shape 513 is formed, being focused at range $R_1$ with a resolution equal to the beam width 517 at the point of the point target. This beam width is substantially less than the unfocused resolution 529 at that range. For a point target at a greater range $R_2$, a beam shape 515 is formed being focused at range $R_2$ with a resolution equal to the beam width 519 which is also substantially less than the width of the unfocused beam 531 at that range. Thus the focusing system of the invention sharpens the beam and provides a substantial increase in resolution at all ranges except at very long ranges.

Figure 13:
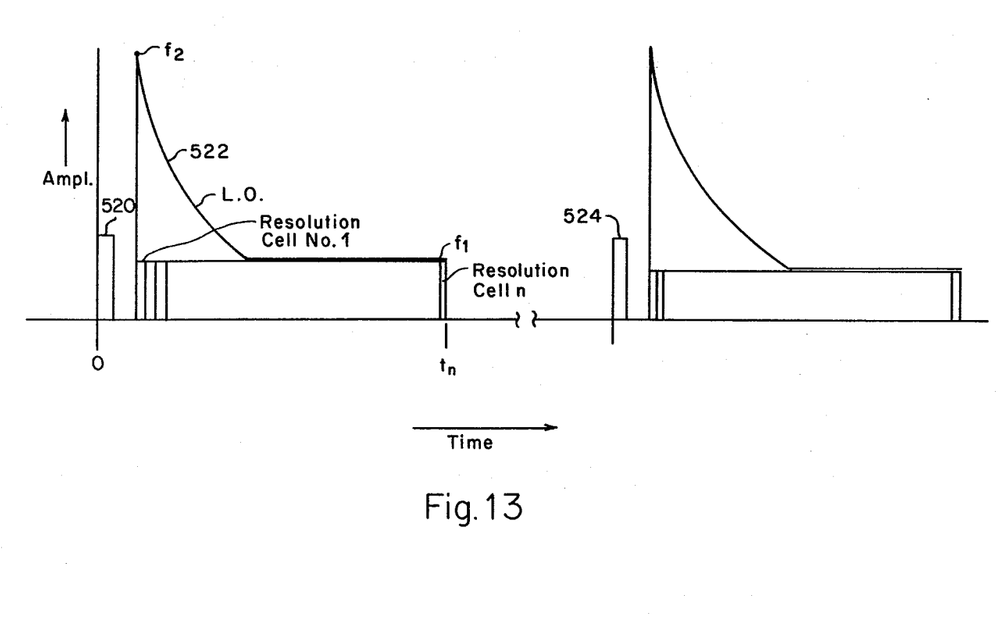
FIG. 13 is a graph of amplitude as a function of time for explaining the processing operation of the system of FIGS. 3a, 3b and 3c.

Referring now to FIG. 13 the clock synchronizes the system transmitter to provide a transmit pulse 520 which is transmitted into space and received by the receiving array at microsecond time $t_o$ for example in a system utilizing 500 feet to 5 miles as the processing range with resolution cells being received and processed up to a time $t_n$ at 60 microseconds. Thus, each resolution cell from resolution cell number 1 to resolution number $n$ is sequentially processed for each range interval, summed and applied to the display, for example. The frequency variation provided by the ramped local oscillator as shown by a curve 522 varies from a high frequency $f_2$ to a final frequency $f_1$. During each interval from 1 microsecond to 60 microseconds, an entire array from one point target is processed and focused in accordance with the principles of the invention. After a suitable time which may be at 250 microseconds, for example, a second pulse 524 is transmitted and the process and focusing operation is repeated.

Figure 14:
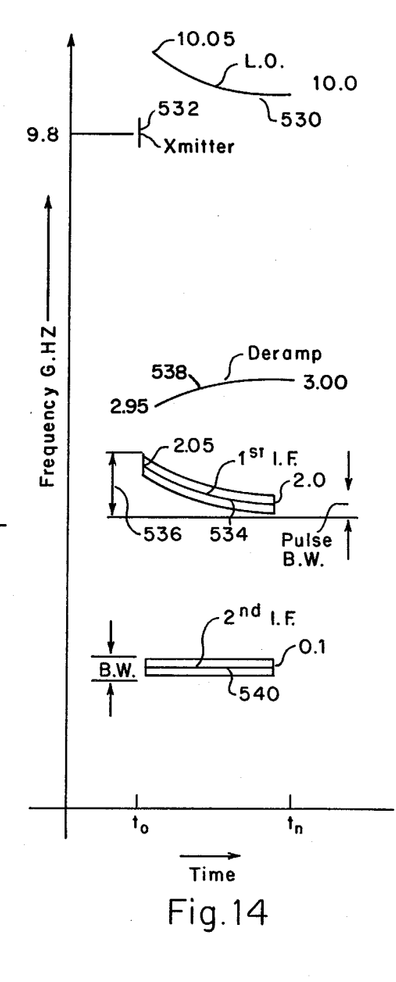
FIG. 14 is a graph of frequency as a function of time further explaining the frequency ramping and its correction in the system of FIGS. 3a, 3b and 3c.

Referring now to FIG. 14 and back to FIGS. 3a, 3b, and 3c the overall operation during a processing interval will be explained in further detail. The frequency of the local oscillator 140 may vary as shown by a curve 530 between 10.05 gHz (Gigahertz) and 10 gHz. The illustrated transmit signal 532 is a short pulse, corresponding to a broad band of frequencies centered at 9.8 gHz and at $t=0$. The first IF frequency of a curve 534 which is provided at the input to the first IF amplifier 197 varies between 2.05 gHz and 2.0 gHz having a bandwidth 536 which is relatively large. The deramp voltage of a curve 538 may vary between 2.95 gHz and 3.00 gHz and when applied to the mixer 195 provides a second IF signal at the output thereof as shown by curve 540 which has a constant value and a bandwidth matched to the transmit bandwidth. Thus, the increase in receiver bandwidth is removed by use of a second mixer at the signal summing junction that is driven by a counter swept oscillator so as to provide a constant IF frequency. This processing between time $t_o$ and $t_n$ is repeated for all range cells of each transmitted pulse.

Thus there has been described a thinned array radar system in which a continuous smooth phase correction required to focus the array at the required ranges is performed. The approach makes use of the fact that for a thinned array there is a separate mixer with its local oscillator input at every element of the array. The system varies the local oscillator frequency in a prescribed manner and utilizes a particular type of feed to distribute the local oscillator signals. Because near ranges appear in the radar first, the local oscillator is set to some high frequency which decays like 1 over time to the plane wave focus frequency. The increase in receiver bandwidth is removed by use of a second mixer at the signal summing junction driven by a counter swept oscillator so as to obtain a constant IF frequency. The high resolution operation is provided without switching operations that would tend to degrade the radar imagery. In the illustrated arrangement, the variation of the total local oscillator line length varies quadratically in a parabolic fashion as an approximation of the spherical wavefront with the local oscillator being ramped with a frequency variation of 1/$t$. Although the description given shows a spherical wave approaching broadside to the antenna, it is to be understood that the invention will function in exactly the same manner for spherical wave or other shaped waves approaching from other directions provided that the phase shifters 128, 129, etc. and time delay circuits 150, 151, etc. are appropriately adjusted to provide coherent addition of an incoming plane wave from that direction. It is to be further understood that the phase correction can be any separable function of time and antenna position for focusing of non-spherical phase fronts in a dielectric media for example and is within the scope of the invention. What is claimed is:

1. A focusing system for a receiving antenna having a plurality of antenna receiving elements each having mixing means comprising:
    oscillator means providing a frequency change as a first selected function of time,
    and feed means coupled between said oscillator means and each of said mixing means for providing a path length distribution to said plurality of antenna elements varying between elements as a second selected function.

2. The combination of claim 1 operable with a transmit antenna having a transmit lobe and transmitting at a selected frequency and in which the antenna elements are spaced along said antenna and separated by distances equal to or greater than the wavelength of said selected frequency to form a multi-lobe receive pattern.

3. A system for receiving radar energy and correcting the phase front of the energy received at an antenna having a plurality of elements therealong with each element coupled to mixing means comprising:
    oscillator means for providing a signal varying in frequency as a first selected function related to the phase front of received energy, and
    feed means coupled between said oscillator means and each of said mixing means for providing a path length distribution to each of said antenna elements varying as a second selected function derived from a separable function.

4. The combination of claim 3 in which said phase front varies as a segment of a circle increasing in radius from the center of the antenna and in which said oscillator means includes means for generating said signal as an increasing function of time and said feed means has a quadratic path length distribution as a function of distance squared along said antenna from the center thereof.

5. The combination of claim 3 in which said phase front is circular and in which
    said oscillator means includes means for providing said first function to vary as a function of one over time, and
    said feed means includes means for providing said second function to vary quadratically with the distance along said antenna from a predetermined center point.

6. The combination of claim 3 in which said antenna moves in an azimuth dimension as energy is received from elements in range and further including processing means coupled to said plurality of mixing means for sequentially responding to the focused signals to sum the signals from said plurality of antenna elements for each of a plurality of range elements and for each of a plurality of progressive azimuth positions.

7. The combination of claim 3 in which said antenna elements are each separated by a distance equal to or greater than a wavelength of received energy to provide a plurality of receive grating lobes.

8. The combination of claim 7 further including a transmit antenna coupled to said receive antenna for illuminating a selected grating lobe.

9. A focused radar system for transmitting and receiving energy in range along an azimuth path comprising:
    a transmission antenna having a transmit lobe,
    a receive antenna, having a plurality of elements positioned along said antenna with an inter element spacing equal to or greater than the wavelength of said energy for developing a multilobe receive pattern,
    synchronizing means coupled between said transmit antenna and said receive antenna for maintaining the transmit lobe to illuminate a selected receive lobe,
    a plurality of mixing means with one coupled to each antenna element of said receive antenna,
    a local oscillator for providing a signal with a frequency variation as a selected function,
    feed means coupled between said local oscillator and each of said mixing means with a path length distribution as a selected function, and
    processing means coupled to said mixing means for providing coherent summing at sequential azimuth positions to the energy received from sequential range positions and focused in said mixing means.

10. The system of claim 9 in which the received energy has a circular phase front at said receive antenna and in which the selected function of said local oscillator provides a frequency variation of one over time and in which the path length distribution of said feed means varies as the distance squared along said antenna.

11. The system of claim 9 in which the selected function controlling said local oscillator is a first selected function of time and in which the selected function of path length distribution is a second selected function.

12. The system of claim 9 in which the received energy has a circular phase front and the selected function controlling said local oscillator is one over time and in which the path length of said feed means varies as distance squared from a center of said receive antenna.

13. The system of claim 9 further including means to control said local oscillator frequency variation to be repetitive at predetermined intervals and said processing means includes means to process the energy over a predetermined range interval of one azimuth position during each local oscillator frequency variation.

14. The combination of claim 9 in which the receive antenna has a center line and the path length distribution is symmetrical around said center line with the maximum path length coupled to the mixing means at the end elements.

15. The combination of claim 9 in which the receive antenna is an array with a center line and the path length difference between mixers at adjacent elements is greatest for the elements at the end of said receive antenna being substantially equal to the distance between the two adjacent elements at the ends of said antenna.

* * * * *